United States Patent [19]
Gee et al.

[11] Patent Number: 5,302,658
[45] Date of Patent: Apr. 12, 1994

[54] METHOD OF MANUFACTURING SILICONE EMULSIONS

[75] Inventors: Ronald P. Gee; Padmakumari J. Varaprath, both of Midland, Mich.

[73] Assignee: Dow Corning Corporation, Midland, Mich.

[21] Appl. No.: 913,555

[22] Filed: Jul. 14, 1992

[51] Int. Cl.$^5$ .......................... C08K 5/07; B01J 13/00
[52] U.S. Cl. .................... 524/732; 524/837; 252/312; 252/314; 106/287.13; 106/287.14; 514/941
[58] Field of Search ............... 524/837, 732; 252/312, 252/314; 106/287.13, 287.14; 514/941

[56] References Cited

U.S. PATENT DOCUMENTS

| | | | |
|---|---|---|---|
| 4,788,001 | 11/1988 | Narula | 252/312 |
| 4,874,547 | 10/1989 | Narula | 252/312 |

FOREIGN PATENT DOCUMENTS

0463431 1/1992 European Pat. Off. ........ C08J 3/03

*Primary Examiner*—Melvyn I. Marquis
*Assistant Examiner*—Karen A. Dean
*Attorney, Agent, or Firm*—Jim L. DeCesare

[57] ABSTRACT

A method is described for making an emulsion in which a mixture is formed containing a polysiloxane and a primary nonionic surfactant having an HLB value of 10 to 19. There is added to the mixture a first portion of surfactant free water gradually in a series of separate incremental steps. This is followed by the addition to the mixture of a secondary nonionic surfactant having an HLB value of 1.8-15. The mixture is stirred until the particle size of the polysiloxane in the mixture is in the range of 1-100 microns. A second portion of water is added to the mixture in an amount sufficient to provide a total content of water in the product of 25-65 percent by weight.

13 Claims, No Drawings

METHOD OF MANUFACTURING SILICONE EMULSIONS

BACKGROUND OF THE INVENTION

The invention relates to a silicone emulsion and to a method of making the silicone emulsion. A process is described in which a particular sequence of manipulative steps has been found to produce certain emulsion compositions possessing a particle size of silicone in the emulsion in the range of one to one hundred microns, in contrast to processes in which the particle size of the silicone in the emulsion has been limited to less than about 0.35 microns.

A process for making polysiloxane emulsions is described in copending U.S. patent application Ser. No. 07/844067 filed Mar. 2, 1992, which is a continuation of U.S. patent application Ser. No. 07/534827 filed Jun. 7, 1990 and now abandoned. The parent application has been published as European Patent Application Publication Number 0 463 431 A2 on Jan. 2, 1992. Each of the three applications are assigned to the same assignee as the present invention.

In the process according to the copending prior application, a silicone oil-in-water emulsion is formed mechanically by forming initially a thick phase emulsion by combining and shearing the silicone, a nonionic surfactant having an HLB value of 10-19, and water. To the thick phase emulsion there is subsequently added another nonionic surfactant but one having an HLB value of 1.8-15.0, together with optional anionic and cationic surfactants. The mixture is sheared to reduce the particle size of the silicone oil in the emulsion to less than 0.35 microns (350 nanometers), and water is added to provide a content of silicone in the emulsion of 1-60 percent by weight.

While such techniques have been found to be effective, the application of these silicone emulsions in personal care applications is limited due to the small particle size of the silicone in the emulsion. According to the present invention, a similar technique has been discovered but which possesses the advantage of producing emulsions better suited for use in products for the personal care market. Thus, emulsions resulting from the process according to the present invention have a particle size of silicone oil in the emulsion of 1-100 microns in contrast to the emulsions described in the copending application which possess a particle size of less than 0.35 microns.

The basis for making an emulsion is to stabilize the silicone oil in water in which the silicone is insoluble. The oil particles are stabilized by adding surfactants to the system. The choice and amount of surfactants used becomes critical in determining the type of emulsion formed (oil-in-water vs. water-in-oil), the particle size, its uniformity and stability.

The particle size of an emulsion has an effect on the end use. For many applications, emulsions need not be destabilized in order to be effective. For hair care applications, especially for use as conditioners, either in conditioning shampoos or as conditioners in a rinse, the effectiveness of the emulsion depends on the amount of silicone that is deposited on to the hair. The higher the particle size, the faster the destabilization or breaking of the emulsion, thus increasing the deposition of the silicone on the hair.

Blends of a very high viscosity silicone polymer gum, with a low viscosity silicone fluid (5 to 1000 cs) have the advantage over other polymers in giving good conditioning effects. This is due to the fact that by mixing silicone gums with a fluid, the gum can be uniformly spread on the surface in a monolayer, giving good feel and softness to the surface of the substrate (hair). Incorporation of such high viscosity silicones into a shampoo is very difficult and cumbersome. By making an emulsion of the silicone gum/fluid blend, many of the difficulties associated with mixing into a shampoo can be avoided. The emulsion can be simply added to the shampoo and mixed by simple stirring.

SUMMARY OF THE INVENTION

This invention is directed to a method of making emulsions from high viscosity polysiloxanes having viscosities upwards of about two million centistokes, and in which the particle size of the polysiloxane in the emulsion is in the range of 1-100 microns in diameter.

The invention is also directed to a method of making emulsions from high viscosity polysiloxanes having a large particle size in which the emulsion is stabilized by means of a thickener or by an increase in the silicone content in the emulsion. The polysiloxane polymer may be of unimodal or bimodal distribution, and may include functional groups.

These and other objects, features, and advantages of the herein defined present invention will become more apparent from a consideration of the following detailed description thereof.

DETAILED DESCRIPTION OF THE INVENTION

The invention relates to a method for producing emulsions from high viscosity polysiloxanes; mixtures of polysiloxanes (herein referred to as bi-modal polysiloxane fluids) which are blends of at least one low viscosity polysilaxane and at least one high viscosity nonvolatile polysiloxane; functional polysiloxanes; and mixtures thereof. Although the invention is particularly useful for producing emulsions from high viscosity polysiloxanes, such limitation should not be placed on the invention as it has also been found useful in producing emulsions from bi-modal polysiloxane fluids, and functional polysiloxanes such as amine functional polysiloxanes, carboxy functional polysiloxanes, haloalkyl functional polysiloxanes, glycol functional polysiloxanes, and vinyl functional polysiloxanes.

The high viscosity polysiloxanes useful in the instant invention are compounds having the formula

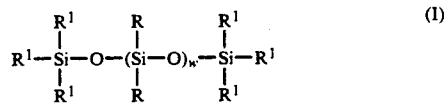

wherein each R is independently selected from the hydrogen atom, an alkyl group having at least 1 carbon atom and an aryl group having 6 to 10 carbon atoms; each $R^1$ is independently selected from R, hydroxy groups, and alkoxy groups; and w has the value such that the viscosity is at least 1,000 centistoke and preferably at least 10,000 centistoke. R may be further exemplified by methyl, ethyl, a $C_6$–$C_{30}$ alkyl group, phenyl, vinyl, and the hydrogen atom. $R^1$ may be further exemplified by methyl, ethyl, a $C_6$–$C_{30}$ alkyl group, vinyl, phenyl, -OH, methoxy, ethoxy, and the hydrogen atom.

The bi-modal polysiloxane fluids are blends of at least one low viscosity polysiloxane and at least one high viscosity non-volatile polysiloxane. The low viscosity polysiloxane may be either a linear or cyclic polysiloxane which further may or may not be volatile. Further, the low viscosity polysiloxanes are defined as those silicone oils having a viscosity of less than 1,000 centistokes, and preferably less than about 500 centistokes. The low viscosity polysiloxane typically comprises 1 to 99% by weight of the bi-modal polysiloxane fluid composition.

The linear low viscosity polysiloxanes are compounds having the formula

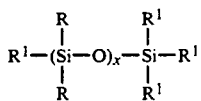
(II)

wherein R and $R^1$ are as described previously and x has the value of at least 1. It is preferred that R and $R^1$ be predominantly the methyl group.

The cyclic low viscosity polysiloxanes are compounds having the formula

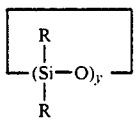
(III)

wherein R is as described above and y has the value of 3 to 7. It is preferred that R be predominantly the methyl group.

The high viscosity non-volatile polysiloxane is a compound having the formula described by (I). Preferred are those compounds of formula (I) having a viscosity of at least 10,000 centistoke and where R is predominantly methyl. The high viscosity non-volatile polysiloxane typically comprises 1 to 99% by weight of the bi-modal polysiloxane fluid composition.

The functional polysiloxanes useful in the invention are compounds having the formula

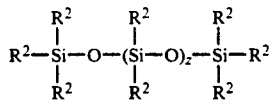
(IV)

wherein each $R^2$ is independently selected from $R^1$, aminoalkyl functional groups containing at least 1 carbon atom, carboxyalkyl functional groups containing at least 1 carbon atom, haloalkyl functional groups containing at least 1 carbon atom, acrylate functional groups, acryloxy functional groups, acrylamide functional groups, vinyl functional groups, and other functional groups having the formula Q—$R^3$— where Q is a functional group containing at least one atom which is not a carbon or hydrogen atom and $R^3$ is selected from an alkylene group having at least 1 carbon atom and an arylene group having 6 to 10 carbon atoms; and z has the value of at least 10. It is preferred that when $R^2$ is a group other than methyl that it comprise less than 50% of the total $R^2$ groups. $R^2$ may be further exemplified by, but not limited to the following functional groups:

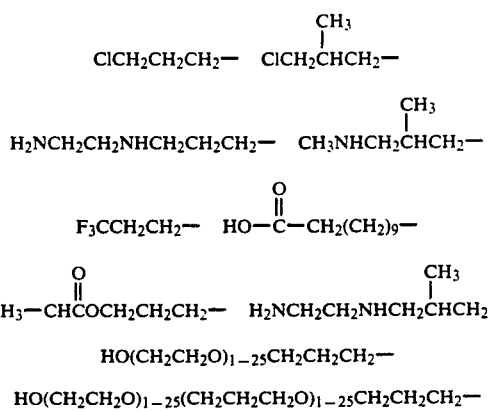

and other functional groups having the formula Q—$R^3$— where Q is a functional group containing at least one atom which is not a carbon or hydrogen atom and $R^3$ is selected from an alkylene group having at least 1 carbon atom and an arylene group having 6 to 10 carbon atoms.

The process for creating the emulsion comprises combining with shearing means a polysiloxane selected from high molecular weight polysiloxanes, bi-modal polysiloxane fluids, functional polysiloxanes; and mixtures thereof; with at least one primary surfactant. It is preferred that the primary surfactant and the silicone be dispersed at a temperature between 20° C. and 100° C. and more preferably between 40° C. and 100° C. After the primary surfactant and silicone have been dispersed, water is added in increments over a period of time. This is followed by the addition of at least one secondary surfactant which is dispersed into the polysiloxane using shear means. It is again preferred that the secondary surfactant be dispersed into the polysiloxane at a temperature between 20° C. and 100° C. and more preferably between 40° C. and 100° C. The resulting composition further is heated to or maintained at a temperature between 20° C. and 100° C. and preferably between 40° C. and 100° C. and mixed using shearing means for a sufficient period of time until the average particle size is within the range of 1-100 microns. The resulting material is then cooled and diluted to form the emulsion.

It is preferred that the processing, including all preliminary mixing, be carried out at temperatures of between 20° C. and 100° C. and more preferably at temperature of between 40° C. and 100° C. at atmospheric pressure. Heat can be applied to the system through the shear forces, electrical means, steam, hot oil, other heat means or any combination thereof.

The components are mixed using shearing means. Useful shearing means may be exemplified by but not limited to, single screw extruders, multiple screw extruders, change can mixers, planetary mixers, kettle mixers, static mixers, blend tanks, paddle mixers, butterfly mixers, sigma blade mixers, G-force mixers, mill type mixers, turbulizer mixers, finger mixers, porcupine mixers, helicone mixers and others. Any shear generating means which produces the necessary shear to form the emulsion can also be used in the process of this invention. The mixing process can be carried out as a batch or continuous process depending on the shearing means used.

The amount of time it takes to produce an emulsion having an average particle size of 1-100 microns is dependent upon the amount of shear, the amount and type of primary and secondary surfactant, the water concentration and the temperature of the components during the processing. Typically, such emulsions can be manufactured in less than six hours. It is important to shear the composition for a sufficient period of time until the average particle size is 1-100 microns.

The primary surfactant which is employed to produce the emulsions in accordance with the present invention is a nonionic surfactant possessing an HLB value of 10-19. Useful nonionic surfactants of this category include polyoxyalkylene alkyl ethers, polyoxyalkylene sorbitan esters, polyoxyalkylene esters, and polyoxyalkylene alkylphenyl ethers. Some specific examples of primary surfactant are Brij 35, Brig 35L, Brij 58, Brij 78, Brij 98, Brij 700, and Brij 721, all products of ICI Americas Inc., Wilmington, Del. Additional nonionic surfactants are products of Union Carbide Chem. & Plastics Co. Industrial Chemicals Div., Danbury, Conn., sold under the trademarks TERGITOL ® TMN-6, TERGITOL ® 15-S-7, TERGITOL ® 15-S-40, and TRITON ® X-405.

The secondary surfactant employed to produce the emulsions in accordance with the present invention is also a nonionic surfactant but possessing an HLB value of 1.8-15. Useful nonionic surfactants of this category include the same types of ethers and esters noted above. Some specific examples of such secondary surfactant are Brij 30, Brij 52, Brij 56, Brij 72, Brij 76, Brij 92, and Brij 97, all products of ICI Americas Inc., Wilmington, Del. Additional secondary nonionic surfactants are products of Union Carbide Chem. & Plastics Co. Industrial Chemicals Div., Danbury, Conn., sold under the trademark TERGITOL ® TMN-3, TERGITOL ® 15-S-3, and TERCITOL ® 15-S-5. Other suitable secondary nonionic surfactants are Dehydol LS-2, a product of Henkel Canada Ltd., Montreal, Quebec, Canada; and Volpo-3 and Volpo-5 which are products of Croda Inc., New York, N.Y.

As previously noted, the particle size of the silicone in the emulsion is dependent upon, among other factors, the amount and the type of surfactant which is employed. Since one of the main features and objects of the present invention is to achieve the production of emulsions having a large particle size of silicone in the emulsion, the process employs only limited and relatively small quantities of surfactant materials. In addition, the process preferably utilizes a high viscosity oil phase in combination with small surfactant ratios, and therefore emulsion quality can be significantly effected by an improper mixing techniques. For example, it is especially important in making emulsions in accordance with the teaching of the present invention, that mixers capable of producing high shear be utilized. Other factors contributing to the successful production of emulsions suitable for purposes of the present invention are the shear rate, and the order of addition of the surfactants.

It is also important that the initial quantities of water which are added be conducted in an incremental fashion over a period of time, rather than all at once. Thus, water should be added in numerous small quantities, and gradually, in order to obtain a single emulsion. The initial addition of water in such small gradual quantities is also required to be surfactant free. The initial steps of water addition constitute the use of an amount of about 3-6 percent by weight of the total content of water in the final emulsion, which total water content can be upwards of about 25-65 percent by weight. It is further preferred that the initial steps in the addition of 3-6 percent by weight of water include a thickener, for the purpose of improving the mixing with the high viscosity silicone polymer.

Suitable thickeners include among others, xanthan gum; sodium alignate; gum arabic; polyoxyethylene guar gum; hydroxypropyl guar gum; cellulose derivatives such as methylcellulose, methylhydroxypropylcellulose, hydroxypropylcellulose, and polypropylhydroxyethyleellulose; starch and starch derivatives such as hydroxyamylose and starch amylose; locust bean gum; electrolytes such as sodium chloride; saccharides such as fructose and glucose; and derivatives of saccharides such as PEG 120 methyl glucose dioleate.

Emulsions formed in accordance with the present invention have been found to possess good stability at room temperature for periods up to about six months and more, and are capable of remaining stable through five freeze/thaw cycles at fifty degrees Centigrade for one month and more.

The procedure for manufacturing emulsions by the process of the present invention involves loading into a high shear mixer 35-75 percent by weight of a silicone and 0.25 to 2.0 percent by weight of a primary surfactant having an HLB value of 10-19. These ingredients are mixed at a slow speed. A quantity of surfactant free water is added to the mixer in an amount of 3-6 percent by weight. This quantity of water constitutes only a portion of the total amount of water present in the final emulsion which ranges from 25-65 percent by weight. This initial quantity of water is added over a period of time in a series of separate steps, each addition of which is followed by continued mixing of the ingredients in the mixer. Anywhere from about five to about ten separate steps in the addition of the water portions to the mixer ingredients may be employed, until the amount of water in the mixer reaches 3-6 percent by weight. As previously noted, it is preferred to include a thickener as the water is added in these various stages. Upon completion of water addition, 0.25 to 2.0 percent by weight of a secondary surfactant having an HLB value of 1.8-15 is added to the mixer. The mixer ingredients are then subjected to high shear in the mixer until the particle size of the silicone is of the order of magnitude of 1-100 microns. This high shear portion of the cycle can be completed in about 3-4 hours typically.

Dilution water sufficient to provide a total water content in the final emulsion of 25-65 percent by weight is added to the mixer. The dilution water is preferably added to the mixer over a period of time in a series of separate steps, each addition of which is followed by continued mixing of the ingredients in the mixer. Again, anywhere from about five to about ten separate steps in the addition of the dilution water portions to the mixer ingredients may be employed. It is likewise preferred to include a thickener as the dilution water is added in these various stages. The total amount of thickener in the final emulsion should not exceed about three, preferably not in excess of one percent by weight of the final emulsion composition. The silicone content of the final emulsion should be in the range of about 50-70 preferably 35-70 percent by weight.

The following examples are set forth for the purpose of further illustrating the concepts and features embodied in the process of the present invention.

EXAMPLE I

A bimodal polysiloxene fluid containing 40 weight % of a hydroxy-endblocked polydimethylsiloxane having a viscosity in the range of 10-20 million cs and 60 wt % of 350 centistoke silicone fluid was prepared using a Neulinger RDH mixer. This mixture was used for preparing the emulsion in the following examples.

EXAMPLE II

Into a clean RDH Neulinger mixer was loaded 2000 gms (50%) of the above bimodal polydimethylsiloxane fluid. To this, 30 gms of Brij 35 L was added and stirred thoroughly for 30 minutes. To this, 180 gms of 1 wt % of xanthan gum solution in water was added gradually over a period of 1 hour and the mixture was agitated for an additional 30 minutes. To this well stirred mixture, 35 grams of Dehydol LS-2 was added and stirred for 2 to 3 hrs. This was followed by the addition of 1765 gms of water containing 1 wt % xanthan gum solution. The particle size ranged from 3-17 microns. The emulsion appeared uniform when observed under a microscope. The emulsion was stable after 6 months at room temperature and did not show any signs of separation.

EXAMPLE III

Into a clean RDH Neulinger mixer was loaded 2000 gms (50%) of the above bimodal polydimethylsiloxane fluid. To this, 30 gms of Brij 35 L was added and stirred thoroughly for about 30 minutes. To this, 180 gms of 1 wt % of xanthan gum solution in water was added gradually over a period of 1 hour and the mixture was agitated for an additional 30 minutes. To this well stirred mixture, 35 grams of Dehydol LS-2 was added and stirred for 2 to 3 hrs. This was followed by the gradual addition of 1765 gms of water containing ½ wt % xanthan gum solution over a period of 1 to 2 hours. The particle size ranged from 3-17 microns. The emulsion appeared uniform when observed under a microscope. The emulsion was stable after 6 months at room temperature and did not show any signs of separation.

EXAMPLE IV

Into a clean RDH Neulinger mixer was loaded 2000 gms (50%) of the above bimodal polydimethylsiloxane fluid. To this, 30 gms of Brij 35 L was added and stirred thoroughly for about 30 minutes. To this, 180 gms of 1 wt % of xanthan gum solution in water was added gradually over a period of 1 hour and the mixture was agitated for an additional 30 minutes. To this well stirred mixture, 35 grams of Dehydol LS-2 was added and stirred for 2 to 3 hrs. This was followed by the gradual addition of 612 gms of water over a period of 1 hr. The particle size ranged from 3-17 microns. The emulsion appeared uniform when observed under a microscope. The emulsion was stable after 6 months at room temperature and did not show any signs of separation.

EXAMPLE V

Into a clean RDH Neulinger mixer was loaded 2000 gms (50%) of the above bimodal polydimethylsiloxane fluid. To this, 30 gms of Brij 35 L was added and stirred thoroughly for about 30 minutes. To this, 180 gms of 1 wt % of xanthan gum solution in water was added gradually over a period of 1 hour and the mixture was agitated for an additional 30 minutes. To this well stirred mixture, 35 grams of Brij 30 was added and stirred for 2 to 3 hrs. This was followed by the addition of 1765 gms of water containing 1 wt % xanthan gum solution. The particle size ranged from 3-17 microns. The emulsion appeared uniform when observed under a microscope. The emulsion was stable after 6 months at room temperature and did not show any signs of separation.

EXAMPLE VI

In a Hobart mixer, 1000 gms of the bimodal polydimethylsiloxane was loaded and to this, 15 gms of Brij 35 L was added, and the mixture was stirred thoroughly for about 30 minutes. This was followed by the gradual addition of 90 gms of 1 wt % xanthan gum solution in water over a period of 30 minutes and the mixing continued for an additional 30 minutes. To this well stirred mixture, 17.5 gms of Dehydol LS-2 was added gradually in 15 minutes, and the mixture stirred for one hour. This was diluted with 877.5 gms of water. Addition of water was carried out in 30 minutes. The emulsion appeared uniform when observed under a microscope and the particle size ranged from 3 to 5 microns.

EXAMPLE VII

Into a clean RDH Neulinger mixer was loaded 2000 gms (50%) of the above bimodal polydimethylsiloxane fluid. To this, 15 gms of Brij 35 L was added and stirred thoroughly for about 30 minutes. To this, 180 gms of 1 wt % of xanthan gum solution in water was added gradually over a period of 1 hour, and the mixture was agitated for an additional 30 minutes. To this well stirred mixture, 17.5 grams of Dehydol LS-2 was added and stirred for 2 to 3 hrs. This was followed by the addition of 1765 gms of water containing 1 wt % xanthan gum solution. The particle size ranged from 3-60 microns. The emulsion appeared uniform when observed under a microscope. The emulsion was stable after 6 months at room temperature and did not show any signs of separation.

It will be apparent from the foregoing that many other variations and modifications may be made in the compounds, compositions, and methods described herein without departing substantially from the essential features and concepts of the present invention. Accordingly, it should be clearly understood that the forms of the invention described herein are exemplary only and are not intended as limitations on the scope of the present invention as defined in the appended claims.

That which is claimed is:

1. A method of making an emulsion comprising the steps of (A) forming a mixture by combining 35 to 75 percent by weight of a polysiloxane and 0.25 to 2.0 percent by weight of a primary nonionic surfactant having an HLB value of 10 to 19, and stirring the mixture until uniform: (B) adding and dispersing 3-6 percent by weight of a first portion of surfactant free water in the mixture, the first portion of surfactant free water being added and dispersed in the mixture gradually over a period of time in a series of from about five to about ten separate incremental steps; (C) adding to the mixture 0.25 to 2.0 percent by weight of a secondary nonionic surfactant having an HLB value of 1.8-15; (D) stirring the mixture until the particle size of the polysiloxane in the mixture is in the range of 1-100 microns; and (E) adding a second portion of water to the mixture in an amount to provide a total content of water in the product of 25-65 percent by weight based on the total weight of the mixture, the second portion of water being added to the mixture gradually over a period of time in a series of from about five to about ten separate incremental steps.

2. A method according to claim 1 in which the first portion of water includes a thickening agent.

3. A method according to claim 2 in which the second portion of water includes a thickening agent.

4. A method according to claim 3 in which the thickening agent is present in an amount of less than about three percent by weight based on the total weight of the mixture.

5. A method according to claim 1 in which the polysiloxane content in the mixture is 35-70 percent by weight.

6. A method according to claim 1 in which the polysiloxane is selected from the group consisting of high viscosity polysiloxanes, bi-modal polysiloxane fluids, functional polysiloxanes, and mixtures thereof.

7. A method according to claim 6 wherein the polysiloxane is a high viscosity polysiloxane having the formula:

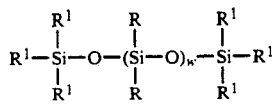

wherein each R is independently selected from the group consisting of the hydrogen atom, an alkyl group having at least one carbon atom, and an aryl group having 6 to 10 carbon atoms; and each $R^1$ is independently selected from R, hydroxy groups, and alkoxy groups; and w has the value such that the viscosity is at least 1,000 centistokes at 25° C.

8. A method according to claim 7 wherein the polysiloxane has a viscosity of at least 10,000 centistokes at 25° C.

9. A method according to claim 6 wherein the polysiloxane is a bi-modal polysiloxane fluid including at least one low viscosity polysiloxane and at least one high viscosity, nonvolatile polysiloxane.

10. A method according to claim 6 wherein the polysiloxane is a functional polysiloxanes having the formula

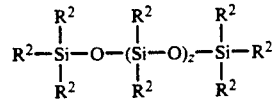

wherein each $R^2$ is independently selected from the group consisting of $R^1$, aminoalkyl functional groups containing at least one carbon atom, carboxyalkyl functional groups containing at least one carbon atom, haloalkyl functional groups containing at least one carbon atom, acrylate functional groups, acryloxy functional groups, acrylamide functional groups, vinyl functional groups, and functional groups having the formula $Q-R^3-$ where Q is a functional group containing at least one atom which is not a carbon or hydrogen atom and $R^3$ is selected from an alkylene group having at least one carbon atom and an arylene group having 6 to 10 carbon atoms; z has a value of at least 10; and $R^1$ is hydrogen, an alkyl group having at least one carbon atom, or an aryl group having 6-10 carbon atoms.

11. An emulsion prepared in accordance with the method described in claim 1.

12. A method of making an emulsion comprising the steps of (A) forming a mixture by combining 35 to 75 percent by weight of a polysiloxane and 0.25 to 2.0 percent by weight of a primary nonionic surfactant having an HLB value of 10 to 19, and stirring the mixture until uniform: (B) adding and dispersing 3-6 percent by weight of a first portion of surfactant free water in the mixture, the first portion of surfactant free water being added and dispersed in the mixture gradually over a period of time in a series of a plurality of separate incremental steps; (C) adding to the mixture 0.25 to 2.0 percent by weight of a secondary nonionic surfactant having an HLB value of 1.8-15; (D) stirring the mixture until the particle size of the polysiloxane in the mixture is in the range of 1-100 microns; and (E) adding a second portion of water to the mixture in an amount to provide a total content of water in the product of 25-65 percent by weight based on the total weight of the mixture, the second portion of water being added to the mixture gradually over a period of time in a series of a plurality of separate incremental steps.

13. An emulsion prepared in accordance with the method described in claim 12.

* * * * *